Patented July 10, 1923.

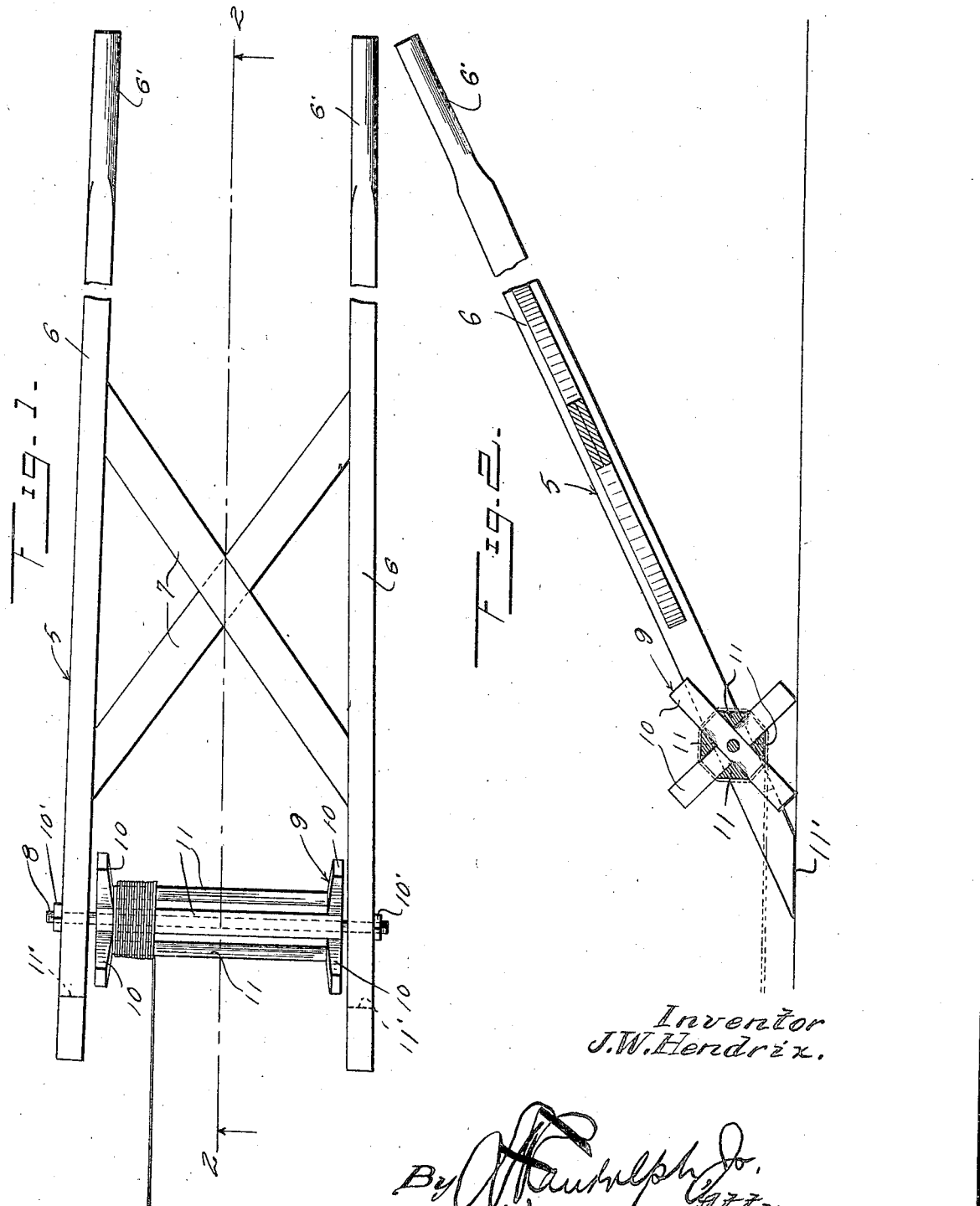

1,461,214

UNITED STATES PATENT OFFICE.

JOHN W. HENDRIX, OF BALDWYN, MISSISSIPPI.

WIRE DISTRIBUTOR.

Application filed June 18, 1919. Serial No. 305,118.

*To all whom it may concern:*

Be it known that I, JOHN W. HENDRIX, a citizen of the United States, residing at Baldwyn, in the county of Prentiss and State of Mississippi, have invented certain new and useful Improvements in Wire Distributors; and I do hereby declare the following to be a full, clear, and exact description of the invention, such as will enable others skilled in the art to which it appertains to make and use the same.

My invention relates to improvements in wire distributors and stretchers having novel means for carrying and dispensing barbed wire.

An important object of this invention is to provide a wire distributor having a spool adapted to be readily removed for the purpose of replacement.

A further object is to provide a wire distributor adapted for conveniently and efficiently supporting a reel of wire.

A further object is to provide a wire distributor consisting of a frame rigidly connected by cross members and adapted for supporting spools of barbed wire whereby the same are prevented from snagging the clothing.

A further object of the invention is to provide a wire dispensing apparatus which is cheap to manufacture, of highly simplified construction and few in parts.

In the accompanying drawing forming a part of this application and in which like numerals are employed to designate like parts throughout the same, Figure 1 is a fragmentary plan view of a wire distributor embodied in my invention, and, Figure 2 is a longitudinal section through the same taken on line 2—2 of Figure 1.

In the drawing wherein for the purpose of illustration is shown a preferred embodiment of my invention, the numeral 5 generally designates a distributor which includes a pair of main supporting bars 6, connected by diagonal intersecting brace members 7. Handles 6' are formed on the rear end portions of the side bars 6. The forward end portions of the members 6 receive the end portions of a shaft preferably constructed of wood. A reel 9 of a suitable construction is rotatably mounted on the shaft 8. Suitable nuts 10' have threaded engagement with the ends of the shaft for retaining the same in position. As indicated in Figure 2 the reel is provided at its ends with radial legs 10. The legs 10 are connected by cross members 11 having their end portions secured to the inner end portions of the legs 10. As shown in Figure 2 the connecting members 11 are triangular in cross section and are spaced from each other.

In use the spool is supplied with a quantity of wire and is arranged on the shaft as illustrated in Figure 1. One end of the wire on the spool is now secured to a fence post and by drawing the distributor away from the post and beyond the other post of the fence the wire may be distributed and stretched in a highly efficient manner. As is obvious one person operates the distributor from the handles 6'. The wire may be stretched by engaging two of the legs of each end of the reel with the ground and thereby preventing the reel from further rotation. Upon locking the reel as described the same may be drawn along the ground as illustrated in Figure 2 and the wire stretched in a highly efficient and convenient manner by one person. The stretching desired is only to the extent of relieving the wire of slack so that the exact length of wire paid out can be determined for cutting without undue waste. During said stretching the proximity of the legs 10 to the ground prevents rotation of the reel or if the reel is at a distance above the ground, the operator may place his foot on the reel to arrest rotation thereof. The lower end portion of the side members 6 are cut away as indicated at 11 for contact with the ground.

While I have shown and described the preferred embodiment of my invention, it is understood that I may make such minor changes in arrangement and construction of parts as will remain within the spirit of the invention and the scope of the appended claim.

Having thus described my invention, what I claim is:—

A wire distributor and stretcher comprising a pair of parallel side members each having a handle formed on one end, each of said side members having their lower end portions cut away to provide flat ground engaging runners and sharp ground penetrating prongs, a distributing reel rotatably mounted between said side members, said reel being provided with spaced radial arms at each of its ends, said side members extending a distance beyond the distributing reel, and the arms of the reel adapted to be thrust into engagement with the ground to prevent the reel rotating and to permit of stretching of the wire, and the penetrating end of the side members being engageable with the ground when the reel is elevated and adapting the device for further stretching of the wire owing to the leverage obtainable by using the side members as stretching levers.

In testimony whereof I affix my signature in presence of two witnesses.

JOHN W. HENDRIX.

Witnesses:
D. M. LOMINICK,
MAYE M. LOMINICK.